(12) United States Patent
Costa et al.

(10) Patent No.: US 11,477,072 B2
(45) Date of Patent: Oct. 18, 2022

(54) SYSTEM AND METHOD FOR PRESCRIPTIVE DIAGNOSTICS AND OPTIMIZATION OF CLIENT NETWORKS

(71) Applicant: OpenVault, LLC, Jersey City, NJ (US)

(72) Inventors: Tony Costa, Green Brook, NJ (US); Mark Trudeau, Hoboken, NJ (US)

(73) Assignee: OpenVault, LLC, Jersey City, NJ (US)

( * ) Notice: Subject to any disclaimer, the term of this patent is extended or adjusted under 35 U.S.C. 154(b) by 0 days.

(21) Appl. No.: 17/022,985

(22) Filed: Sep. 16, 2020

(65) Prior Publication Data
US 2021/0083926 A1 Mar. 18, 2021

Related U.S. Application Data

(60) Provisional application No. 62/901,579, filed on Sep. 17, 2019.

(51) Int. Cl.
*H04L 41/0654* (2022.01)
*H04L 41/0686* (2022.01)
(Continued)

(52) U.S. Cl.
CPC ........... *H04L 41/0654* (2013.01); *G06N 5/04* (2013.01); *G06N 20/00* (2019.01);
(Continued)

(58) Field of Classification Search
CPC ........ G06N 20/00–20; G06N 5/00–048; H04L 63/00–308
See application file for complete search history.

(56) References Cited

U.S. PATENT DOCUMENTS 7,433,943 B1 * 10/2008 Ford ................... H04L 41/5009
370/235
10,275,710 B1 * 4/2019 Teredesai ............... G06Q 10/10
(Continued)

OTHER PUBLICATIONS

Wong, Tong-Sheng, Gaik-Yee Chan, and Fang-Fang Chua. "A Machine Learning Model for Detection and Prediction of Cloud Quality of Service Violation." International Conference on Computational Science and Its Applications. Springer, Cham, 2018. (Year: 2018).*
(Continued)

*Primary Examiner* — Glenton B Burgess
*Assistant Examiner* — Julian Chang
(74) *Attorney, Agent, or Firm* — Foley & Lardner LLP

(57) ABSTRACT

At least one aspect is directed to the monitoring and management of in-home broadband subscriber computer networks allowing for automatic network issue detection and resolution. The systems and methods described herein can monitor the network utilization, subscriber information, and subscriber devices using protocols such as TR-069 and SNMP. The systems described herein are service provider and vendor agnostic, being compliant with the TR-098 and TR-131 protocols to allow for remote management, diagnosis, and configuration of subscriber devices. The systems and methods described herein can reduce the number of home visits by service provider technicians by providing a remote network management solution capable of automatically diagnosing and resolving network issues with an issue detection model. The system can be non-intrusive and executed from a cloud computing environment to allow access to millions of devices.

20 Claims, 7 Drawing Sheets

(51) Int. Cl.
| | |
|---|---|
| *H04L 41/0213* | (2022.01) |
| *G06N 20/00* | (2019.01) |
| *H04L 41/22* | (2022.01) |
| *H04L 43/0876* | (2022.01) |
| *H04L 41/16* | (2022.01) |
| *H04L 41/14* | (2022.01) |
| *H04L 43/50* | (2022.01) |
| *G06N 5/04* | (2006.01) |

(52) U.S. Cl.
CPC ...... *H04L 41/0213* (2013.01); *H04L 41/0686* (2013.01); *H04L 41/14* (2013.01); *H04L 41/16* (2013.01); *H04L 41/22* (2013.01); *H04L 43/0876* (2013.01); *H04L 43/50* (2013.01)

(56) References Cited

U.S. PATENT DOCUMENTS

| | | | | |
|---|---|---|---|---|
| 10,387,795 | B1* | 8/2019 | Oldridge | G06N 5/04 |
| 10,671,443 | B1* | 6/2020 | Ramachandran | G06F 16/903 |
| 10,721,142 | B1* | 7/2020 | Mathur | H04L 41/5074 |
| 10,748,161 | B1* | 8/2020 | Norbeck, Jr. | H04L 41/082 |
| 10,911,318 | B2* | 2/2021 | Gopalakrishnan | G06N 20/00 |
| 2001/0038639 | A1* | 11/2001 | McKinnon, III | H04L 12/2801 370/468 |
| 2005/0223089 | A1* | 10/2005 | Rhodes | H04L 43/0876 709/223 |
| 2007/0150950 | A1* | 6/2007 | Aaron | H04L 63/00 726/22 |
| 2008/0040088 | A1* | 2/2008 | Vankov | H04L 41/0681 703/13 |
| 2008/0144519 | A1* | 6/2008 | Cooppan | H04L 41/142 370/252 |
| 2009/0219820 | A1* | 9/2009 | Acke | H04M 11/062 370/241 |
| 2010/0023806 | A1* | 1/2010 | Justen | H04L 41/0213 714/15 |
| 2010/0030902 | A1* | 2/2010 | Justen | H04L 41/0213 709/228 |
| 2010/0070614 | A1* | 3/2010 | Keum | G06F 15/163 709/219 |
| 2010/0131643 | A1* | 5/2010 | Okayama | H04L 12/40013 709/224 |
| 2010/0138895 | A1* | 6/2010 | Bouchat | H04L 63/102 726/1 |
| 2011/0078288 | A1* | 3/2011 | Chen | H04L 41/0886 709/220 |
| 2011/0145608 | A1* | 6/2011 | Hwang | H04L 12/2898 713/310 |
| 2011/0149720 | A1* | 6/2011 | Phuah | H04L 43/50 370/216 |
| 2011/0314145 | A1* | 12/2011 | Raleigh | H04L 47/12 709/224 |
| 2012/0215911 | A1* | 8/2012 | Raleigh | H04M 15/66 709/224 |
| 2012/0250570 | A1* | 10/2012 | Parker | H04L 43/0882 370/253 |
| 2013/0046865 | A1* | 2/2013 | Liu | H04L 41/12 709/220 |
| 2013/0097304 | A1* | 4/2013 | Asthana | H04L 41/5006 709/224 |
| 2013/0117425 | A1* | 5/2013 | Jarl | G06F 16/9535 709/221 |
| 2014/0189362 | A1* | 7/2014 | Van Den Broeck | G06F 11/1446 713/176 |
| 2014/0321291 | A1* | 10/2014 | Chen | H04L 41/0803 370/241 |
| 2015/0135012 | A1* | 5/2015 | Bhalla | H04L 41/0631 714/26 |
| 2015/0263891 | A1* | 9/2015 | Baugher | H04L 41/5041 370/254 |
| 2015/0312089 | A1* | 10/2015 | Yang | H04L 41/0654 370/217 |
| 2015/0332145 | A1* | 11/2015 | Vasseur | G06N 5/04 706/12 |
| 2015/0332155 | A1* | 11/2015 | Mermoud | G06N 20/00 706/12 |
| 2015/0333953 | A1* | 11/2015 | Vasseur | H04L 47/127 370/228 |
| 2015/0333969 | A1* | 11/2015 | Vasseur | H04L 41/5025 709/224 |
| 2015/0333992 | A1* | 11/2015 | Vasseur | H04L 12/4641 370/252 |
| 2015/0334030 | A1* | 11/2015 | Vasseur | H04L 47/115 370/230 |
| 2016/0011912 | A1* | 1/2016 | Rangaraju | G06Q 10/06 718/105 |
| 2016/0026922 | A1* | 1/2016 | Vasseur | G06N 5/048 706/12 |
| 2016/0028599 | A1* | 1/2016 | Vasseur | H04L 41/145 370/252 |
| 2016/0028608 | A1* | 1/2016 | Dasgupta | H04L 43/16 370/252 |
| 2016/0028632 | A1* | 1/2016 | Vasseur | H04L 47/122 370/237 |
| 2016/0191314 | A1* | 6/2016 | Russell | H04L 41/22 709/221 |
| 2016/0212031 | A1* | 7/2016 | Jain | H04L 43/0876 |
| 2017/0099309 | A1* | 4/2017 | Di Pietro | H04L 63/1416 |
| 2017/0104634 | A1* | 4/2017 | Yermakov | H04L 41/142 |
| 2017/0118081 | A1* | 4/2017 | Rius I Riu | H04W 8/18 |
| 2017/0244777 | A1* | 8/2017 | Ouyang | H04L 43/08 |
| 2017/0262818 | A1* | 9/2017 | Horrell | G06Q 10/0635 |
| 2017/0279829 | A1* | 9/2017 | Vasseur | H04L 63/1425 |
| 2017/0279831 | A1* | 9/2017 | Di Pietro | H04L 63/0263 |
| 2017/0279832 | A1* | 9/2017 | Di Pietro | H04L 63/1466 |
| 2017/0279839 | A1* | 9/2017 | Vasseur | H04L 63/1416 |
| 2017/0310539 | A1* | 10/2017 | Jin | H04L 41/16 |
| 2017/0310541 | A1* | 10/2017 | Jin | H04L 41/147 |
| 2017/0310562 | A1* | 10/2017 | Jin | H04L 67/1097 |
| 2017/0345082 | A1* | 11/2017 | Hoxworth | G06Q 10/087 |
| 2017/0353991 | A1* | 12/2017 | Tapia | H04L 41/0631 |
| 2018/0062941 | A1* | 3/2018 | Brown | H04L 41/5032 |
| 2018/0167812 | A1* | 6/2018 | Nagarajamoorthy | H04W 12/66 |
| 2018/0183684 | A1* | 6/2018 | Jacobson | H04L 47/821 |
| 2018/0247239 | A1* | 8/2018 | Horrell | G06F 11/008 |
| 2018/0248744 | A1* | 8/2018 | Danisik | H04L 67/1034 |
| 2018/0248759 | A1* | 8/2018 | Danisik | H04L 43/04 |
| 2018/0248905 | A1* | 8/2018 | Cote | G06F 17/18 |
| 2018/0278486 | A1* | 9/2018 | Mermoud | H04L 41/5009 |
| 2018/0287856 | A1* | 10/2018 | Whitner | H04L 41/0695 |
| 2018/0336502 | A1* | 11/2018 | Gonguet | G06Q 10/067 |
| 2018/0336582 | A1* | 11/2018 | Gonguet | G06N 7/005 |
| 2018/0359597 | A1* | 12/2018 | Lazar | H04L 43/0817 |
| 2019/0149425 | A1* | 5/2019 | Larish | G06N 3/0454 706/16 |
| 2019/0220760 | A1* | 7/2019 | Kolar | H04L 41/142 |
| 2019/0281476 | A1* | 9/2019 | Lyon | G06N 3/08 |
| 2019/0303211 | A1* | 10/2019 | Dias | G06F 8/77 |
| 2020/0044938 | A1* | 2/2020 | Dias | H04L 41/5019 |
| 2020/0068440 | A1* | 2/2020 | Talbert | H04W 36/22 |
| 2020/0099733 | A1* | 3/2020 | Chu | H04L 65/605 |
| 2020/0120003 | A1* | 4/2020 | Sridhar | H04L 41/5064 |
| 2020/0186423 | A1* | 6/2020 | Torres | G06F 9/45558 |
| 2020/0204452 | A1* | 6/2020 | Bhat | H04L 41/0883 |
| 2020/0336398 | A1* | 10/2020 | Thomas | H04L 41/20 |
| 2020/0382361 | A1* | 12/2020 | Chandrasekhar | G06N 20/00 |
| 2020/0383121 | A1* | 12/2020 | Sanghavi | H04L 43/028 |

OTHER PUBLICATIONS

Duc, Thang Le, et al. "Machine learning methods for reliable resource provisioning in edge-cloud computing: A survey." ACM Computing Surveys (CSUR) 52.5 (2019): 1-39. (Year: 2019).*

* cited by examiner

SYSTEM AND METHOD FOR PRESCRIPTIVE DIAGNOSTICS AND OPTIMIZATION OF CLIENT NETWORKS

CROSS-REFERENCES TO RELATED APPLICATIONS

This application claims the benefit of priority under 35 U.S.C. § 119 from U.S. Provisional Patent Application Ser. No. 62/901,579 entitled "SYSTEM AND METHOD FOR PRESCRIPTIVE DIAGNOSTICS AND OPTIMIZATION OF CLIENT NETWORKS," filed on Sep. 17, 2019, the disclosure of which is hereby incorporated by reference in its entirety.

BACKGROUND

Broadband service providers can provide technical support services to networks of client devices. Providing technical support can include sending a technician to directly service the client. It is challenging to diagnose problems and prescribe solutions to network issues from a remote location.

SUMMARY

At least one aspect of the present disclosure is directed to remote diagnostics and prescriptive management of broadband subscriber networks. The systems and methods described herein can monitor access networks, subscriber networks, devices, and services for proactive operational optimization. Broadband operators and subscribers can apply the systems and methods herein for network, device, and service diagnostics with real-time remote "FIX IT NOW" resolution. The systems and methods can also provide actionable analytics for sales, marketing, care, and engineering based on the activity in subscriber networks. The systems and methods can also provide automated configuration services to automatically set up and configure subscriber devices over the subscriber network based on operator defined policies for specific devices, profiles, and/or service classes.

The systems and methods described herein can provide end-to-end visibility of subscriber networks and prescriptive resolution of network issues by providing a connected dashboard that can provide network visibility, subscriber details, user/role based access, and auto-detection of new devices/capabilities. The dashboard can be provided from a cloud or on premises. The systems and methods can look at the health of the in-home WLAN network of subscribers via technical report 069 (TR-069) protocol and simple network management protocol (SNMP) data and analyze the devices that are using the subscriber modem. The dashboard can provide a connected "pane of glass" diagnostics look at different levels of the subscriber network, from the access network, for example for cable network, between the Cable Modem Termination System (CMTS) and the subscriber's cable modem, the subscriber modem, and to the in-home WLAN network of a subscriber, to identify if subscriber network issues are part of service provider network issues. The dashboard can also provide a "FIX IT NOW" button that can provide recommendations and remote modem control possibilities, allowing customer service representatives to solve subscriber network issues. This can reduce issue resolution and reduce customer service call times along with unnecessary subscriber home visits and customer-premises equipment (CPE) exchanges.

This is an improvement in controlling cost of customer service, as the present solution can provide the ability to troubleshoot from the access layer to subscriber devices and determine where issues exist before taking more extensive troubleshooting measures (e.g., sending out a customer support technician to directly service the subscriber). Small WiFi connected devices connected to in-home subscriber wireless networks are becoming more abundant. This can create new challenges for service provider networks: not only do service providers need to support more devices, but they must also provide customer service to resolve network issues that may be unrelated to the subscriber network. For example, a majority of network service provider calls are as simple as "what's my password?" A simple and automated system that can provide in-home network monitoring and support is an improvement over existing network management technology, and can reduce costs for both consumers and broadband service providers.

The systems and methods described herein can provide end-to-end visibility of the network segment service the individual customer, from the CMTS serving the customer, through the access network, to the subscriber's modem and the devices connected to the subscriber modem. This includes monitoring of the service delivery path for each subscriber including the access network, subscriber network, devices, and services for proactive operation optimization. The systems described herein can correlate network conditions with subscriber usage, device performance, and service package to provide an interactive dashboard displaying network quality information. The dashboard can include color coded operational quality indicators for a variety of network metrics for rapid triage of conditions potentially impacting service delivery. The dashboard can also provide an automated machine learning enabled issue detection model which can provide the best resolution recommendation for a variety network issues, including proactive issue resolution or manual execution of network management policies. The dashboard can also provide actionable analytics of network metrics and device usage, including sales and marketing information with a holistic view of opportunities to right size the subscriber service (e.g., provide an upgrade), based on the subscriber's service package, usage behavior and/or network attributes.

The systems and methods described herein are vendor agnostic, and provide monitoring and control of subscriber devices independent of network equipment, gateways, or modem manufacturers. The systems and methods can remotely manage broadband service modems using the TR-069 protocol, the CPE Wide Area Network (WAN) Management protocol, and the Simple Network Management Protocol (SNMP) protocol, including supporting standards such as technical report 098 (TR-098) and technical report 181 (TR-181) with no additional agent or application on subscriber devices. Using these protocols, the systems and methods described herein can provide network capacity utilization measurement and reporting, such as household data usage volume and in-home subscriber network visibility. The data collected by the system can drive service provider revenues via proactive upgrade recommendations based on multiple criteria such as subscriber data usage vs. subscriber data provisioning, the top percentage of subscriber usage per speed tier, and in-home subscriber device topology.

The systems and methods of the present disclosure provide a technical improvement to subscriber network management systems. In particular, the technology described herein can access data from and provide instructions to manage one or more subscriber networks without requiring additional applications or agents that execute on subscriber network devices (e.g., modems, routers, etc.). In other implementations, agents or applications executing on subscriber devices increase the computational overhead at subscriber networks, which can detrimentally affect subscriber network performance. The systems and methods described herein provide an improvement to management systems by leveraging various protocols as described herein to provide remote management via an access network without impacting the performance of the subscriber networks. This is a technical improvement over other network monitoring and management implementations.

The systems and methods described herein can leverage existing cloud infrastructure to provide non-intrusive and quick deployment. The use of a cloud based infrastructure also allows for automatic and streamlined upgrades, while allowing the system to be scalable and available to millions of devices. In addition to a cloud based model, the system may also be installed on-premises if required by the application.

The present disclosure provides systems and methods to resolve broadband subscriber issues with only a single customer service interaction by providing extended visibility and control into the devices in the subscriber's in-home network. This has the advantage of reducing operational costs and improving broadband subscriber satisfaction. By applying in-home network diagnostics and automatic prescriptive solutions to subscriber network issues, the systems and methods can reduce the customer service call handling duration, reduce customer service call escalation, reduce the number of in-home visits by service provider technicians, provide remote device management for subscribers, reduce the subscriber churn, and identify potential upgrade candidates based on subscriber usage.

At least one aspect of the present disclosure is generally directed to a method. The method can be performed, for example, by a computing device having one or more processors and a memory. The method can include receiving network data including network parameters of an access network having a plurality of connected devices. The method can include generating analytics data using the network parameters and information from the plurality of connected devices of the access network. The method can include identifying a classification of a network issue using an issue detection model and the analytics data. The method can include determining a solution to the network issue using the classification and the network parameters. The method can include providing a graphical user interface indicating the classification of the network issue and the solution.

In some implementations, the method can include determining that the network issue can be resolved via automatic intervention. In some implementations, the method can include generating network policy instructions configured to resolve the network issue. In some implementations, the method can include providing the network policy instructions to a connected device of the plurality of connected device to resolve the network issue.

In some implementations, the method can include receiving at least one of simple network management protocol information or technical report information. In some implementations, receiving the network parameters can further include receiving usage information of at least one connected device of the plurality of connected devices. In some implementations, the usage information can include at least one of a signal strength of the connected device, a bandwidth utilization of the connected device, or device information of the connected device. In some implementations, the method can include calculating a ratio of the bandwidth utilization of the connected device to a provisioned bandwidth of the connected device as part of the network parameters.

In some implementations, the method can include identifying a subset of connected devices from the plurality of devices that utilize network bandwidth above a predetermined threshold during a predetermined time period. In some implementations, the method can include generating the analytics data to indicate the subset of connected devices that utilize network bandwidth above the predetermined threshold during the predetermined time period.

In some implementations, the method can include generating, using the issue detection model, a plurality of classifications of a second network issue. In some implementations, the method can include providing the plurality of classifications of the second network issue for display on a user interface. In some implementations, the method can include receiving a selection of a classification of the plurality of classifications from the user interface. In some implementations, the method can include training the issue detection model based on the selection of the classification.

In some implementations, the issue detection model can be at least one of a linear regression model, a logistic regression model, a decision tree model, a support vector machine model, a Naïve Bayes model, a k-nearest neighbors model, a k-means model, a random forest model, a dimensionality reduction algorithm, a gradient boosting algorithm, a neural network, or a convolutional neural network. In some implementations, the method can include generating policy management protocol data to reconfigure a connected device of the plurality of network devices that is indicated in the analytics data. In some implementations, the method can include generating a list of suggestions based on the classification and the network parameters. In some implementations, the method can include providing the list of suggestions in at least one first region of the user interface. In some implementations, the method can include providing the network parameters of the access network in at least one second region of the user interface.

Another aspect of the present disclosure relates to a system configured for generating a preamble. The system can include one or more processors coupled to memory. The system can receive network data including network parameters of an access network having a plurality of connected devices. The system can generate analytics data using the network parameters and information from the plurality of connected devices of the access network. The system can identify a classification of a network issue using an issue detection model and the analytics data. The system can determine a solution to the network issue using the classification and the network parameters. The system can provide a graphical user interface indicating the classification of the network issue and the solution.

In some implementations, the system can determine that the network issue can be resolved via automatic intervention. In some implementations, the system can generate network policy instructions configured to resolve the network issue. In some implementations, the system can provide the network policy instructions to a connected device of the plurality of connected device to resolve the network issue.

In some implementations, the system can receive at least one of simple network management protocol information or technical report information. In some implementations, the system can receive usage information of at least one connected device of the plurality of connected devices. In some implementations, the usage information can include at least one of a signal strength of the connected device, a bandwidth utilization of the connected device, or device information of the connected device. In some implementations, the system can calculate a ratio of the bandwidth utilization of the connected device to a provisioned bandwidth of the connected device as part of the network parameters.

In some implementations, the system can identify a subset of connected devices from the plurality of devices that utilize network bandwidth above a predetermined threshold during a predetermined time period. In some implementations, the system can generate the analytics data to indicate the subset of connected devices that utilize network bandwidth above the predetermined threshold during the predetermined time period.

In some implementations, the system can generate, using the issue detection model, a plurality of classifications of a second network issue. In some implementations, the system can provide the plurality of classifications of the second network issue for display on a user interface. In some implementations, the system can receive a selection of a classification of the plurality of classifications from the user interface. In some implementations, the system can train the issue detection model based on the selection of the classification. In some implementations, the issue detection model is at least one of a linear regression model, a logistic regression model, a decision tree model, a support vector machine model, a Naïve Bayes model, a k-nearest neighbors model, a k-means model, a random forest model, a dimensionality reduction algorithm, a gradient boosting algorithm, a neural network, or a convolutional neural network.

In some implementations, the system can generate policy management protocol data to reconfigure a connected device of the plurality of network devices that is indicated in the analytics data. In some implementations, the system can generate a list of suggestions based on the classification and the network parameters. In some implementations, the system can provide the list of suggestions in at least one first region of the user interface. In some implementations, the system can provide the network parameters of the access network in at least one second region of the user interface.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of managing network policies. The various concepts introduced above and discussed in greater detail below may be implemented in any of numerous ways, as the described concepts are not limited to any particular manner of implementation.

Figure 1:
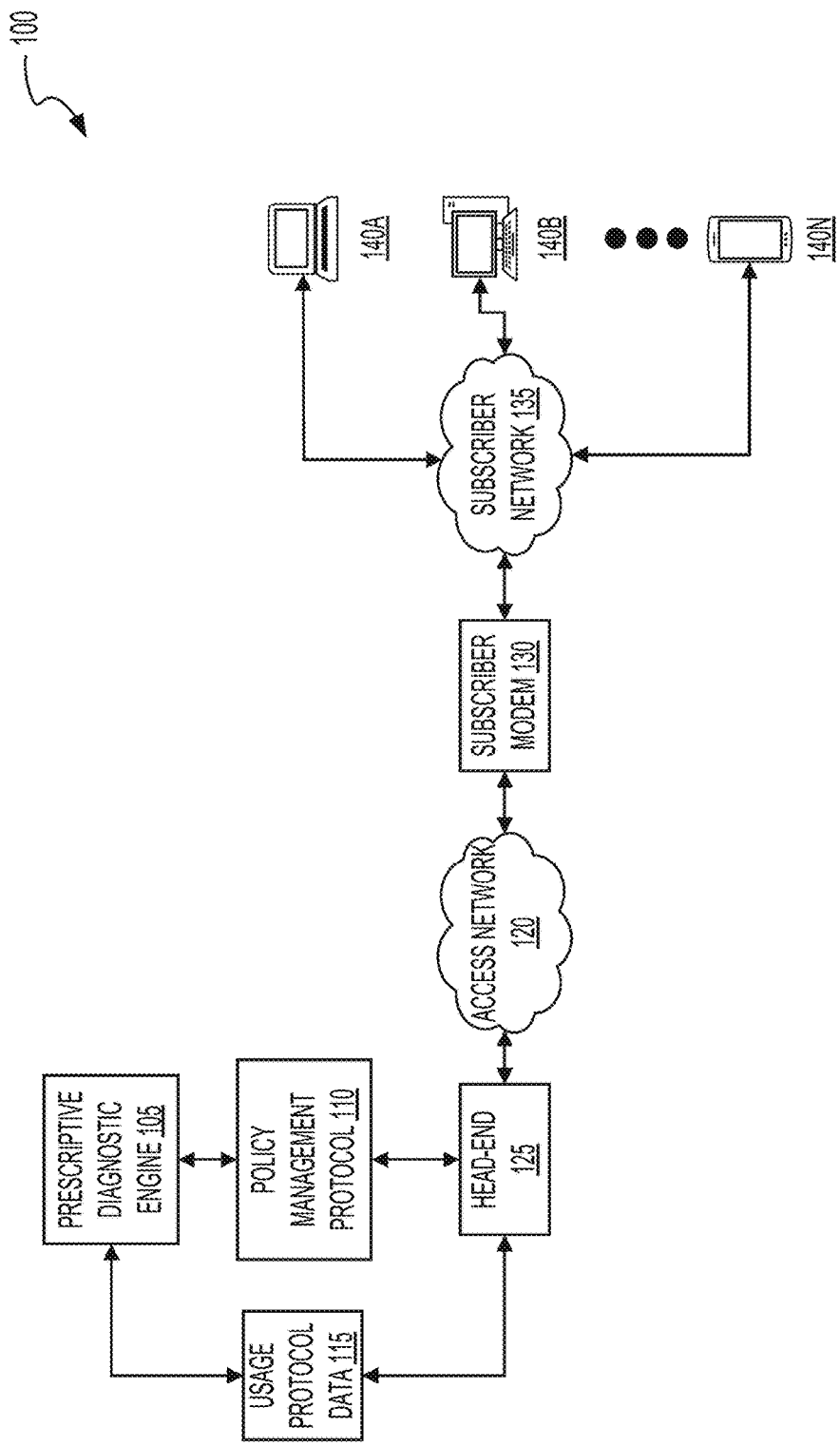
FIG. 1 is a block diagram depicting an implementation of an environment 100 for managing subscriber networks using a prescriptive diagnostic engine.

FIG. 1 is a block diagram depicting an implementation of an environment 100 for managing subscriber networks using a prescriptive diagnostic engine. The environment 100 can include at least one Prescriptive Diagnostic Engine 105. The Prescriptive Diagnostic Engine 105 of the environment 100 can leverage at least one policy management protocol 110. The Prescriptive Diagnostic Engine 105 of the environment 100 can receive usage protocol data 115. The environment 100 can include at least one access network 120. The environment 100 can include at least one service provider head-end 125. The environment 100 can include at least one subscriber modem 130. The environment 100 can include at least one subscriber network 135. The environment 100 can include one or more subscriber devices 140A-N (hereinafter generally referred to as subscriber devices 140).

Figure 6:
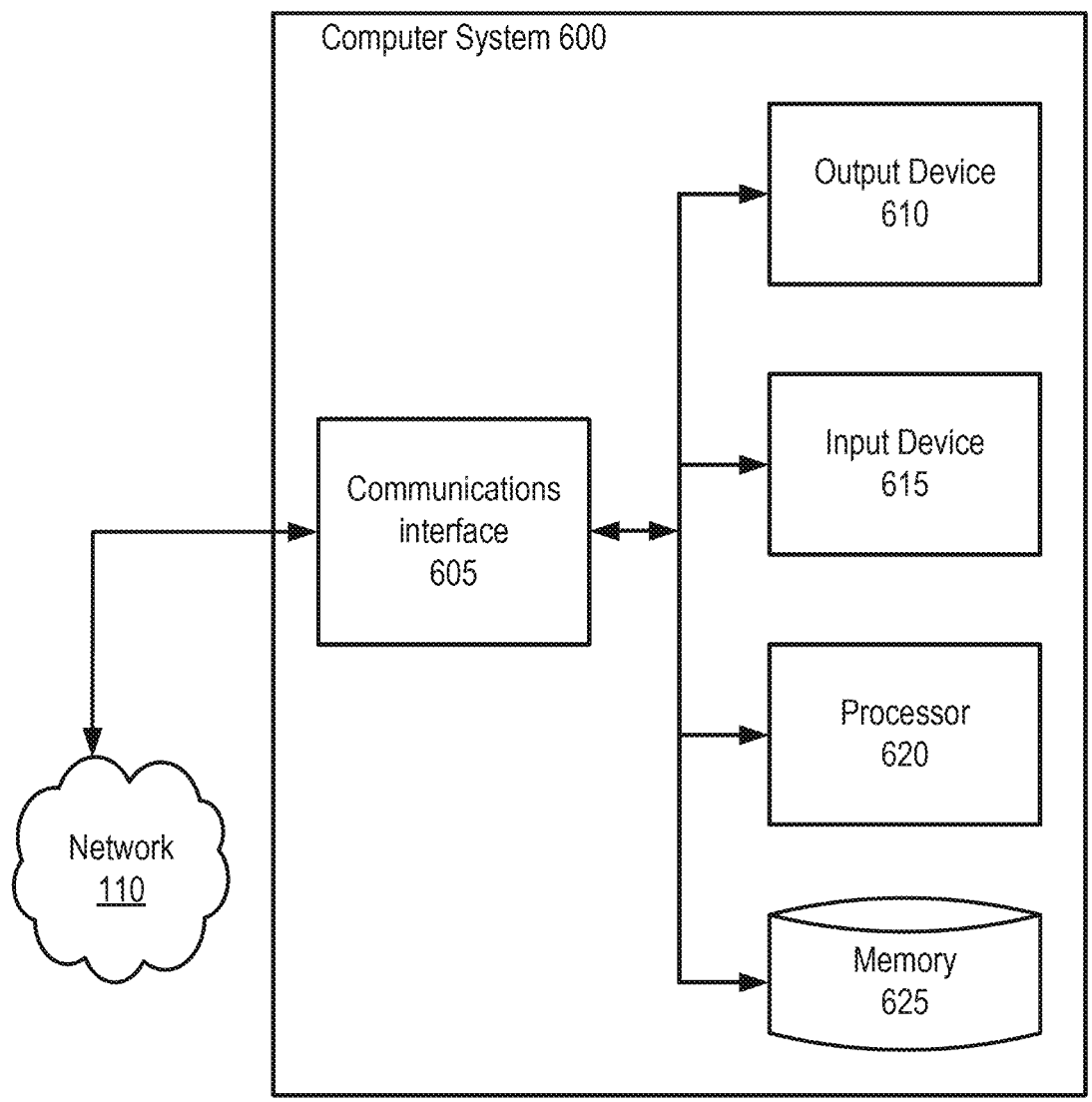
FIG. 6 shows the general architecture of an illustrative computer system that may be employed to implement any of the computer systems discussed herein.

Each of the components (e.g., the access network 120, the usage protocol data 115, the policy management protocol data 110, the Prescriptive Diagnostic Engine 105, etc.) of the environment 100 can be implemented using the components of a computing system 600 detailed herein in conjunction with FIG. 6. For example, the Prescriptive Diagnostics Engine 105 can include servers or other computing devices. The access network 120 can include servers or other computing devices. Each of the components of the environment 100 can perform the functions detailed herein.

The Prescriptive Diagnostic Engine 105 can monitor, diagnose, and provide solutions to issues related to the access network 120, the subscriber network 135, and the subscriber devices 140 of the environment 100. The Prescriptive Diagnostic Engine 105 can perform any of the functionality of the operational monitoring service 212 detailed herein in conjunction with FIG. 2. The Prescriptive Diagnostic Engine 105 can receive usage protocol data 115 from access network 120 to monitor and determine access network conditions and subscriber network conditions. For example, the Prescriptive Diagnostic Engine 105 can monitor access network utilization, the signal strength of individual modems 130, subscriber modem signal information, and subscriber device details and utilization information.

For example, the Prescriptive Diagnostic Engine 105 can determine the overall network utilization of a subscriber as a percentage by calculating a ratio between the bandwidth utilization of a subscriber and the provisioned bandwidth of a subscriber. The bandwidth utilization of a subscriber can be determined by analyzing the usage protocol data 115. The Prescriptive Diagnostic Engine 105 can also determine the signal strength of a subscriber modem. Signal strength information can be determined, for example, by using the policy management protocol data 110, such the TR-069 protocol, to access metrics provided by individual modems. The Prescriptive Diagnostic Engine 105 can also determine information about the subscriber devices 140 connected to the subscriber modem 130. For example, the Prescriptive Diagnostic Engine 105 can use the TR-069 protocol to access the subscriber modem 130 and determine and monitor information about the usage of individual devices on the subscriber network 135. The Prescriptive Diagnostic Engine 105 can also determine information about the broadband infrastructure connecting the service provider head-end 125 to one or more subscriber modems 130. For example, the Prescriptive Diagnostic Engine 105 can determine and monitor the signal to noise ratio for the upstream and downstream channels of a subscriber modem 130. In this way, the Prescriptive Diagnostic Engine 105 can monitor the service delivery path for each subscriber using the access network 120.

The Prescriptive Diagnostic Engine 105 can use the information gathered from the usage protocol data 115 and the policy management protocol 110 to detect and diagnose potential issues with any portion of the service delivery path for one or more subscribers. The Prescriptive Diagnostic Engine 105 can provide automatic solutions to issues detected in the service delivery path. In the event that an automatic solution to the issue is not possible, the Prescriptive Diagnostic Engine 105 can provide a manual solution to a relevant party, for example the subscriber or a network operator. The Prescriptive Diagnostic Engine 105 can also provide automatic configuration of user devices by accessing the subscriber network 135 using the policy management protocol 110.

The policy management protocol 110 can be used by the Prescriptive Diagnostic Engine 105, one or more devices of the access network 120, and/or one or more devices of the subscriber network 135 to implement subscriber network management policies. The policy management protocol 110 can also provide the Prescriptive Diagnostic Engine 105 with information about the subscriber network 135, for example information about the subscriber modem 130 and the subscriber devices 140. The policy management protocol 110 can include data related to the TR-069 specification. The policy management protocol 110 can provide remote management of customer-premises equipment (CPE) connected to an access network for broadband service. The policy management protocol 110 can also include data related to the CPE WAN Management Protocol (CWMP). CWMP is a bidirectional protocol that can provide communication between CPE and the Prescriptive Diagnosis Engine 105. The policy management protocol 110, for example CWMP, can provide high-level operations such as service activation and reconfiguration (e.g., initial configuration, service re-establishment, etc.), remote subscriber support (e.g., report subscriber device status, check subscriber device functionality, manual reconfiguration, etc.), firmware and configuration management (e.g., upgrade/downgrade modem firmware, backup/restore modem configuration), and diagnostics and monitoring (e.g., throughput and connectivity diagnostics, parameter value retrieval, log file retrieval, etc.).

The usage protocol data 115 can provide network utilization and device information about subscriber networks to the Prescriptive Diagnostic Engine 105. The usage data can include data related to the SNMP protocol. SNMP data can provide information about the subscriber system in the form of one or more variables organized in a Management Information Base (MIB). The MIB can describe system status and configuration information. In a non-limiting example embodiment, the Prescriptive Diagnostic Engine 105 can manage one or more SNMP agents (e.g., the cable head-end 125, the subscriber modem 130, the subscriber devices 140, etc.). Using SNMP GET requests, the Prescriptive Diagnostic Engine 105 can enumerate request SNMP variables that indicate contain management information about the networks and devices of environment 100. In this example, the responses to these requests by the SNMP agents (e.g., the cable head-end 125, the subscriber modem 130, the subscriber devices 140, etc.) constitute the usage protocol data 115. The protocol data 115 can include usage information about the network, usage by different devices, Internet Protocol (IP) address values, media access control (MAC) address values, and other networking information.

As shown in environment 100, the usage protocol data 115 can be received by the Prescriptive Diagnostics Engine 105 from the head-end 125 via the access network 120. For example, the Prescriptive Diagnostics Engine 105 can send or transmit commands (e.g., requests for network data, etc.) to a subscriber modem 130 via the head-end 125 or the access network 120. Thus, the head-end 125 can behave as an interface between the subscriber modems coupled to the access network and policy management devices such as the Prescriptive Diagnostics Engine 105.

The access network 120 can provide one or more subscriber modems 130 with access to a service provider head-end 125. The access network may be a coaxial infrastructure that is configured to deliver broadband services via radio frequency signals in coaxial cable. In some implementations, the access network 120 may be a hybrid fiber-coaxial infrastructure that delivers broadband services to the subscriber modems 130. In some implementations, the access network 120 can be a fiber-optic network infrastructure that can deliver broadband services to subscriber optical network termination units or gateways. In implementations where the access network 120 is a fiber-optic network infrastructure, the subscriber modems 130 can be said subscriber optical network termination units or gateways. In some situations, portions of the access network 120 may become damaged and interfere with the delivery of services to one or more broadband modems. The Prescriptive Diagnosis Engine 105 can monitor and detect the status of the access network by probing the subscriber modems 130 with usage protocol data 115 and policy management data 110 (e.g., via the head-end 125, etc.).

The cable head-end 125 can provide one or more subscriber modems 130 with broadband service by acting as a bridge between the core network (e.g., the Internet) and the access network 120. The head-end 125 can be a node to which one or more subscriber modems 130 connect to receive broadband services. The head-end can have two main interfaces: one to connect to a core network (e.g., the Internet), and another to connect to a broadband delivery infrastructure, for example access network 120. The Prescriptive Diagnostic Engine 105 can apply management protocols to implement management policies on the head-end 125, or management policies or solutions to network issues in the subscriber network 135 via the head-end 125. The Prescriptive Diagnostic Engine 105 can also request and receive usage protocol data 115 about any of the agents in environment 100 via the head-end 125. As such, the head-end acts as a gateway through which the Prescriptive Diagnostic Engine 105 can monitor one or more subscriber modems 130, subscriber networks 135, and subscriber devices 140.

The subscriber modem 130 can receive broadband service from a cable head-end 125, and provide a subscriber network 135 to one or more subscriber devices 140. The subscriber modem 130 can communicate with the head-end 125 via the access network 120 using a standard protocol. In some implementations, the subscriber modem 130 can communicate with the head-end 125 using the Data Over Cable Service Interface Specification (DOCSIS) protocol. The subscriber modem 130 can act as an SNMP agent and provide the Prescriptive Diagnostic Engine 105 with SNMP variables via the access network 120. For example, the subscriber modem can receive an SNMP GET request from the Prescriptive Diagnostic Engine 105. The subscriber modem 130 can then provide the Prescriptive Diagnostic Engine 105 with the requested variables (e.g., device usage information, information about the devices on subscriber network 135. The subscriber modem 130 can also communicate with the Prescriptive Diagnostic Engine 105 using a policy management protocol 110. For example, the subscriber modem 130 can interact with the Prescriptive Diagnostic Engine 105 using the CWMP TR-069 protocol. In this example, the subscriber modem 130 can provide the Prescriptive Diagnostic Engine 105 with information about the individual devices connected to the subscriber network 135, including usage and connectivity information.

The subscriber network 135 can be a local area network (LAN) or a WiFi network established by a subscriber to connect to broadband services provided by the subscriber modem 135. The subscriber modem 135 act as a local router for the subscriber devices 140, including establishing a LAN or a wireless network using the Dynamic Host Configuration Protocol (DHCP) to automatically assign IP addresses. The subscriber network 135 can provide Internet access to subscriber devices 140 via the subscriber modem 130.

The subscriber devices 140 can be any devices that are capable of connecting to the subscriber network 135. For example, the devices 140 can include a tablets, laptops, personal computers, televisions, smart televisions, telephones, smart phones, personal digital assistants (PDA), Internet of Things (IoT) devices, and other devices that can connect to a wireless network. In some implementations, the subscriber network is a cellular data network capable of providing cellular data services to user devices. At times, the subscriber devices 140 may have issues connecting with the subscriber network 135. In such situations, the subscriber modem 130 can provide the Prescriptive Diagnostic Engine 105 with information related to the subscriber devices 140, for example CWMP data, to diagnose and resolve the connectivity issues with the subscriber network 135.

Figure 2:
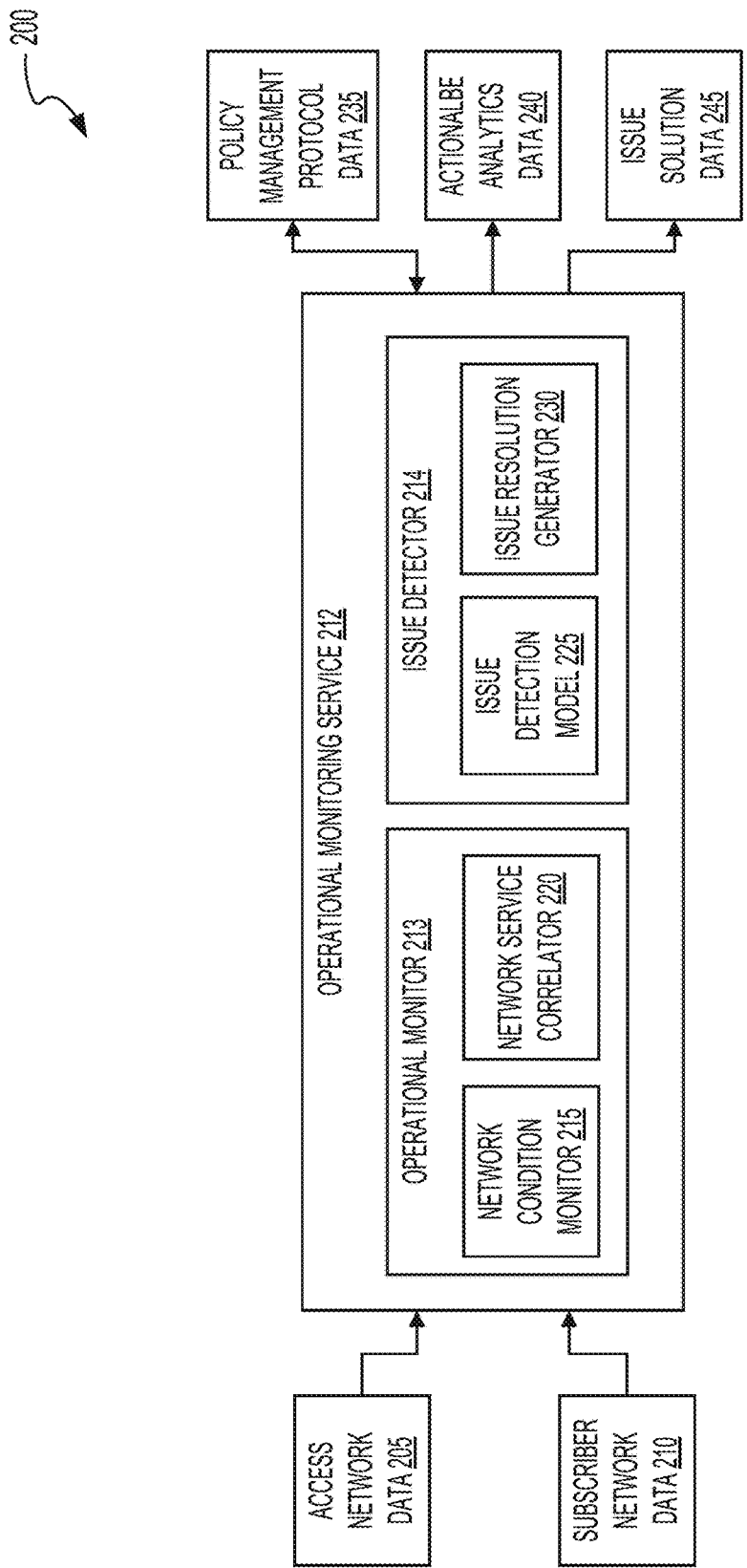
FIG. 2 shows a block diagram depicting an example implementation of an operational monitoring service for subscriber networks.

FIG. 2 illustrates a block diagram depicting an example implementation of a system 200 for monitoring, analyzing, and providing solutions for access networks and subscriber networks. The system 200 can include at least one operational monitoring service 212. The operational monitoring service 212 can acquire, receive, or identify access network data 205 and subscriber network data 210. The operational monitoring service 212 can include at least one operational monitor 213 and at least one issue detector 214. The operational monitor 213 of the operational monitoring service 212 can include at least one network condition monitor 215 and at least one network service correlator 220. The issue detector 214 of the operational monitoring service 212 can include at least one issue detection model 225 and at least one issue resolution generator 220. The operational monitoring service 212 can transmit and receive policy management protocol data 235. The operational monitoring service 212 can provide actionable analytics data 240. The operational monitoring service 212 can provide issue solution data 245.

Each of the components (e.g., operational monitoring service 212, the operational monitor 213, the issue detector 214, the network condition monitor 215, the network service correlator 220, the issue detection model 225, the issue resolution generator 230, etc.) of the system 200 can be implemented using the components of a computing system 600 detailed herein in conjunction with FIG. 6. For example, the functionality of the operational monitoring service 212 or any of its components can be performed and/or executed using servers or computing devices. Each of the components of the system 200 can perform the functions detailed herein.

The access network data 205 can include information about an access network, for example the access network 120 of environment 100. The access network data 205 can include signal information about the access network 120. For example, the access network data could be the signal strength of the access network received by one or more subscriber modems 130. The access network data 205 can also include information about how many modems 130 are serviced by a particular head-end 125. The access network data 205 can be queried, collected, and/or received by the operational monitoring service 212. The access network data 205 can include SNMP data and CWMP data. The access network data 205 can also include information about the signal-to-noise ratio of the signals received by one or more cable modems, for example subscriber modems 130. The access network data 205 can include information about the average utilization of upstream and downstream channels in the access network 120. The access network data 205 can also include information about different communication channels used by the head-end 125 and the subscriber modems 130. For example, the access network data 205 can include information about the upstream power level of the upstream channel, and the downstream power level of the downstream channel. The access network data 205 can also include the CMTS address.

The subscriber network data 210 can include information about a subscriber network, for example the subscriber network 135 of environment 100. The subscriber network data 210 can be received by the operational monitoring service 212 in the form of SNMP data and in the form of CWMP data. For example, the operational monitoring service 212 may use CWMP to communicate with one or more subscriber modems 130. The operational monitoring service 212 may also use SNMP data to access information about subscribers from a head-end, for example head-end 125. The network subscriber data 210 can include information about one or more modems 130, including MAC address, Wide Area Network (WAN) MAC address, IP address, model number, manufacturer name, serial number, software/firmware version. The subscriber network data can also include information received from the head-end 125 servicing the modem 130, for example subscriber billing account, subscriber billing cycle information, and subscriber data provisions and usage. The subscriber network data 210 can also include usage data for subscriber devices 140 connected to the subscriber network 135. The subscriber network data 210 can include information indicating that a new device has connected to the subscriber network 135.

The operational monitoring service 212 can be executed on a data processing system, for example the Prescriptive Diagnostic Engine 105 to provide operational monitoring and issue resolution for subscriber networks. The operational monitoring service 212 can monitor any at least any of the data described herein relating to service provider head-ends, access networks, subscriber modems, subscriber networks, and subscriber devices. The operational monitoring service 212 can monitor, receive, query, and/or otherwise request any of the access network data 205 and the subscriber network data 210. The operational monitoring service 212 can use the access network data 205 and the subscriber network data 210 to detect and diagnose network issues along the service delivery pathway (e.g., from the head-end 125 to the subscriber devices 140). The operational monitoring service 212 can provide automatic solutions for the issues detected from the access network data 205 and the subscriber network data 210. If the operational monitoring service 212 cannot provide an automatic solution to a detected issue, the operational monitoring service 212 can provide and suggest a manual solution. The operational monitoring service 212 can also provide and format the access network data 205 and the subscriber network data 210 into one or more user interfaces for display, for example the user interface of FIG. 4. The operational monitoring service 212 can also provide manual solutions via a user interface, for example in the user interface of FIG. 5. The operational monitoring service 212 can also provide actionable analytics data 240 based on the access network data 205 and the subscriber network data 210.

The operational monitoring service 212 can provide a web interface that can be accessed through a browser on a device, for example a mobile device. The operational monitoring service 212 can provide a self-care application through the web interface to a subscriber. The self-care application can be accessed by a subscriber through a mobile device or other computing device. The self-care application provided by the operational monitoring service 212, for example the application depicted in FIG. 7, can provide any of the data, diagnostics, and prescriptive recommendations as the user interfaces discussed above. For example, the self-care application can provide self-diagnosis and resolution tools directly to a subscriber, including "FIX IT NOW" functionality. This can allow the subscriber to resolve network issues without contacting a support service. The operational monitoring service 212 can also provide a technical assistance application through the web interface to a technician. The technical assistance application can allow the technician to resolve issues from a subscriber. The technician can resolve subscriber issues using the technical assistance application while at the customer premise. In some implementations, the operational monitoring service 212 can provide a self-care application that is native to a mobile device or another type of computing device. In some implementations, the operational monitoring service 212 can provide a technical assistance application that is native to a mobile device or another type of computing device.

The operational monitor 213 of the operational monitoring service 212 can monitor access networks and subscriber networks to actively detect network issues. The operational monitor 213 can be responsible for receiving, requesting, or otherwise monitoring network conditions. For example, the operational monitor 213 can monitor any metrics included in the access network data 205 and/or the subscriber network data 210 related to network operations. The operational monitor 213 can also correlate the network conditions with subscriber usage, device performance, and subscriber service package. The operational monitor 213 can include at least one network condition monitor 215 and at least one network service correlator 220.

The network condition monitor 215 can monitor one or more network conditions to determine network metrics and functionality. For example, the network condition monitor 215 can monitor the signal strength of the access network 120, including the signal to noise ratio of the signals received at the subscriber modem and the signal power for the upstream and downstream communication channels between the subscriber modem 130 and the head-end 125. The network condition monitor 215 can also monitor metrics related to the subscriber network 135, for example WiFi signal strength, bandwidth usage of subscriber devices 140, overall bandwidth usage of the network, device log information, and the highest usage devices on the subscriber network 135. The network condition monitor 215 can also monitor information about interfaces on the subscriber modem 130, for example the overall usage of each network interface (e.g., Ethernet, 2.4 GHz WiFi, 5.0 GHz WiFi, etc.). The network condition monitor 215 can also detect if new devices are added to a subscriber network 135. The network condition monitor 215 can also use policy management protocol data 235 (e.g. CWMP data) to gain visibility into subscriber networks 135 and subscriber devices 140.

The network service correlator 220 can correlate the network service based on the access network data 205 and the subscriber network data 210 with subscriber usage, device performance, and service packages. The network service correlator 220 can generate actionable analytics data 240 based on the information monitored by the network condition monitor 215. For example, the network service correlator 220 can correlate the high bandwidth utilization in a particular pay period with the addition of several new subscriber devices 140. The network service correlator 220 can then generate actionable analytics data 240 including a suggestion that the subscriber upgrade to a service package with a higher bandwidth limit to account for the usage by the new devices. The network service correlator 220 can also provide issue solution data 245. For example, the network service correlator 220 can correlate that the WiFi signal strength for a certain group of subscriber devices 140 on a subscriber network 135 is very high, but the WiFi signal strength for a different group of subscriber devices 140 on the subscriber network 135 is very low. In this case, the network correlator may generate issue solution data 245 which includes a suggestion to purchase a wireless repeater to increase the signal strength of the WiFi router in the subscriber modem 130.

The issue detector 214 of the operational monitoring service 212 can automatically detect and provide solutions for network issues. The issue detector 214 can automatically detect network issues using the access network data 205 and the subscriber network data 210 in conjunction with an issue detection model 225. The issue detector 214 can then automatically generate issue solution data 245, which can include information related to manual solutions to subscriber issues. The issue detector 214 can also generate policy management protocol data 235 to implement network management policies and provide automatic solutions to network issues. The network management policies included in the policy management protocol data 235 can include network policies to optimize network performance for one or more subscriber modems 130.

The issue detection model 225 can use a machine learning architecture applied to network metrics to automatically determine and classify network issues. The issue detection model 225 can use any of the access network data 205 and the subscriber network data 210 as an input to the model to detect and classify network issues. The issue detection model 225 can include any machine learning model (e.g. linear regression, logistic regression, decision tree, support vector machine (SVM), Naïve Bayes, k-Nearest Neighbors (kNN), k-Means, random forest, dimensionality reduction algorithm, gradient boosting algorithms, neural networks, convolutional neural networks, etc.). In some implementations, the issue detection model 225 is pre-trained before the system 200 is implemented in an environment, for example environment 100. In some implementations, the issue detection model is trained based off user input to the user interface provided by the network condition monitor 215. For example, the issue detection model 225 may detect an issue and provide a number of possible classifications to the user interface. The issue detection model 225 can use a manual user selection of the classification to further train the model.

Training the issue detection model 225 can include comparing an output of the issue detection model 225 with an expected output, and modifying the parameters of the issue detection model 225 to improve its accuracy. The modifications to the parameters of the issue detection model 225 can be based on the difference between the output of the issue detection model 225 and the expected output. For example, if the issue detection model 225 is a neural network model, the weights or biases of the nodes in the neural network can be updated to cause the output of the issue detection model 225 to more closely resemble the expected output. In some implementations, the expected output can be provided from user input via a user interface, for example as described herein above. In some implementations, training the issue detection model 225 can include updating one or more coefficients of the issue detection model 225 such that the output of the issue detection model more closely resembles an expected output. To determine an amount to vary or update each of the coefficients or other parameters of the issue detection model 225, a training process can be used, such as a gradient descent algorithm, or other learning algorithm.

The issue resolution generator 230 can generate solutions to network issues, including the network issues detected by the issue detection model 225. Based off of the output of the issue detection model 225, the issue resolution generator can attempt to generate policy management protocol data 235 to automatically solve the issue. For example, the issue detection model 225 may detect that a subscriber device 140B has a poor connection to the subscriber modem 130 because the subscriber modem was configured improperly. In this example, the issue resolution generator 230 can generate policy management protocol data (e.g., CWMP data) to reconfigure the subscriber modem 130 to be compatible with the subscriber device 140B without impacting the other subscriber devices 140. The issue resolution generator 230 can also generate a list of suggestions based on the output of the issue detection model 225. In some implementations, the list of suggestions can be displayed on user interface, for example the user interface of FIG. 5.

The policy management protocol data 235 can provide information about subscriber devices to the operational monitoring service 212, and allow the operational monitoring service to implement network management policies. The policy management data 235 can include CWMP data to automatically manage device resources. For example, the policy management data 235 can provide high level operations such as service activation and reconfiguration (e.g., initial configuration, service re-establishment, etc.), remote subscriber support (e.g., report subscriber device status, check subscriber device functionality, manual reconfiguration, etc.), firmware and configuration management (e.g., upgrade/downgrade modem firmware, backup/restore modem configuration), and diagnostics and monitoring (e.g., throughput and connectivity diagnostics, parameter value retrieval, log file retrieval, etc.).

The actionable analytics data 240 can reflect subscriber usage information, as well as subscriber device 140 activity and information about subscriber networks 135. For example, the actionable analytics data 240 can include information about the types of devices connected to a subscriber network 135. The actionable analytics data 240 can also include information related to usage of Internet services (e.g., streaming services, shopping services, content delivery platforms, etc.). The actionable analytics data 240 can also provide an indication that a particular subscriber would benefit from a service package upgrade. For example, the network service correlator 220 can determine that a particular subscriber has been consistently exceeding to their provisioned data due to an increase in streaming activity. The actionable analytics data 240 generated by the network service correlator 220 can include a suggestion that the subscriber upgrade to a service package with more provisioned data.

The issue solution data 245 can include information and protocol data to resolve a variety of subscriber network issues. The issue solution data 245 can include a list of manual suggestions to solve a network issue detected by the issue detector 214. For example, the issue detection model may determine that the subscriber devices 140 of a subscriber network 135 have a weak WiFi signal that is affecting the performance of the network. The issue resolution generator 230 can generate issue solution data 245 that includes a list of suggestions to address the weak WiFi signal. In a non-limiting example, the list of items can include "Move the devices closer to the modem", "Add a wireless repeater to the network", "Change SSID security configuration", "Change WiFi channel", and "Reset WiFi password". The issue solution data 245 can be provided to the user via a user interface, for example the user interface in FIG. 5. Upon selection of a particular action in the list, the issue resolution generator 230 can generate policy management protocol data 235 to address the issue. Furthering this example, if the user selects "Change WiFi channel", the issue resolution generator 230 can generate CWMP data to configure the modem to change the WiFi channel of the subscriber network 135.

Figure 3:
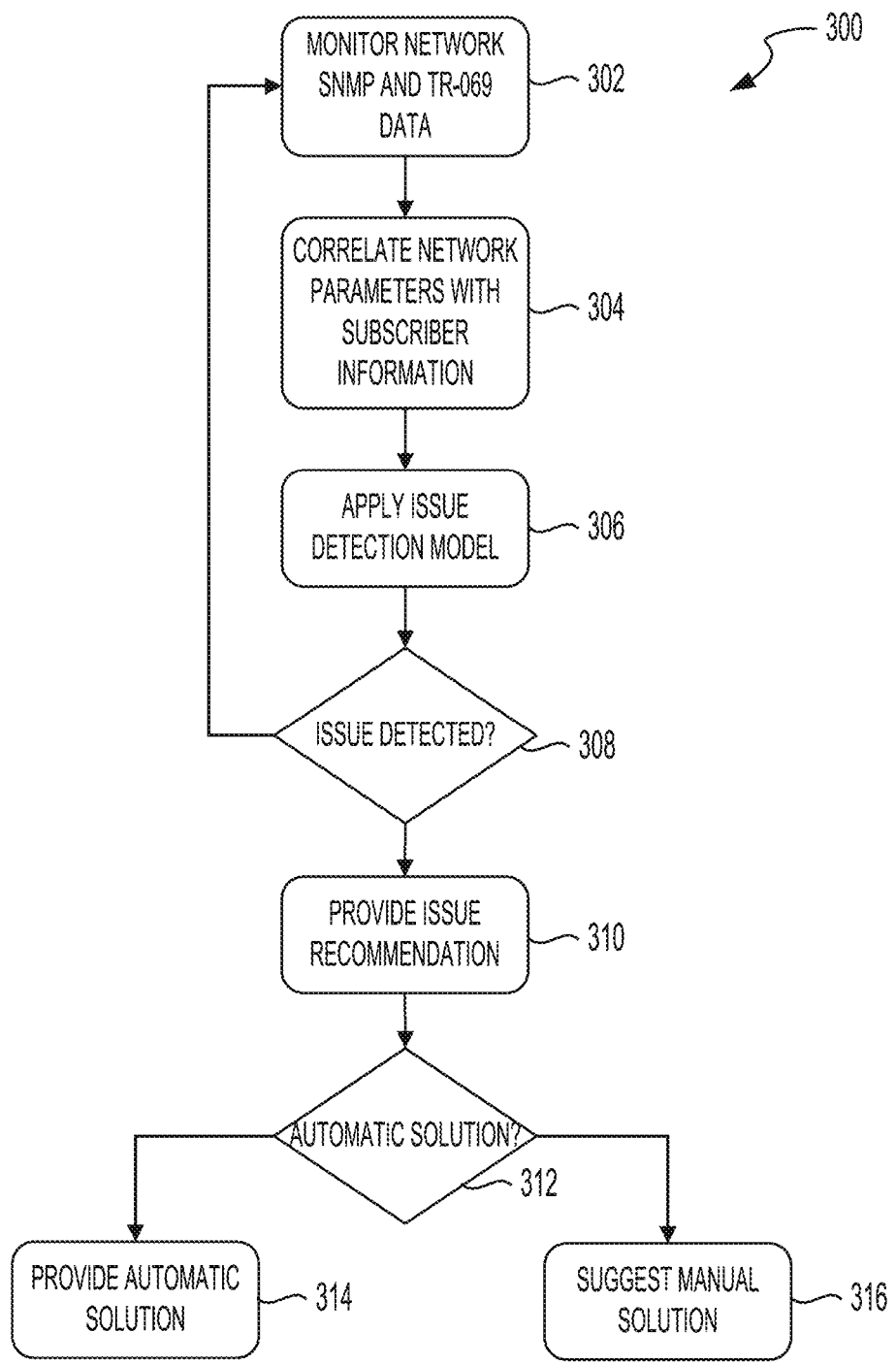
FIG. 3 shows a flow diagram of an example process for the diagnosis and resolution of subscriber network issues.

Referring now to FIG. 3, depicted is a flow diagram of a method 300 for monitoring and providing solutions to issues in a subscriber network. The method 300 can be implement or performed using the Prescriptive Diagnostic Engine 105 described herein in conjunction with FIG. 1, the operational monitoring service 212 described herein in conjunction with FIG. 2, or the computer system 600 described herein in conjunction with FIG. 6. In brief overview, a data processing system (e.g., the Prescriptive Diagnostic Engine 105, operational monitoring service 212, computer system 600, any other computing device described herein, etc.) can monitor network SNMP and TR-069 data (302). The data processing system can correlate network parameters with subscriber information (304). The data processing system can apply an issue detection model (306). The data processing system can determine whether an issue has been detected (308). The data processing system can provide an issue recommendation (310). The data processing system can determine whether there is an automatic solution to the issue (312). The data processing system can provide the automatic solution (314). The data processing system can suggest a manual solution (316).

The data processing system (e.g., the Prescriptive Diagnostic Engine 105, the operational monitoring service 212, etc.) can monitor SNMP and TR-069 data (302). Monitoring the SNMP data can include sending SNMP GET requests to monitor desired SNMP variables. In some implementations, the SNMP variables are predetermined. In some implementations, the SNMP variables are defined by a network operator. In some implementations, the SNMP variables are automatically determined. The data processing system can monitor the TR-069 data using the CPE WAN Management Protocol. The CPE WAN protocol information can include high level operations such as service activation and reconfiguration (e.g., initial configuration, service re-establishment, etc.), remote subscriber support (e.g., report subscriber device status, check subscriber device functionality, manual reconfiguration, etc.), firmware and configuration management (e.g., upgrade/downgrade modem firmware, backup/restore modem configuration), and diagnostics and monitoring (e.g., throughput and connectivity diagnostics, parameter value retrieval, log file retrieval, etc.).

The data processing system (e.g., the Prescriptive Diagnostic Engine 105, the operational monitoring service 212, etc.) can correlate network parameters with subscriber information (304). Correlating network parameters with subscriber information can include correlating the subscriber data usage, subscriber service package, and subscriber device types to determine network conditions. For example, a subscriber network 135 is determined to be slower than it should be based on the available upstream and downstream bandwidth of the modem. However, the network correlator determines that this is due to the fact that the subscriber modem 130 has too many devices connected to the same WiFi channel, causing network congestion issues on the subscriber network 135.

The data processing system (e.g., the Prescriptive Diagnostic Engine 105, the operational monitoring service 212, etc.) can apply an issue detection model (e.g., the issue detection model 225, etc.) (306). The issue detection model can take the SNMP data, the TR-069 data, service package information, and device information as input and generate a classification of an issue as an output. In some implementations, the classification is performed automatically. In some implementations, the classification model must first be trained before it can classify network issues. In some implementations, the issue detection model can detect that network issues are not present. In some implementations, the issue detection model can be trained to provide a plurality of output values, for example in a vector, array, or other type of data structure. The outputs can be probability values that are each assigned to one or more possible network issues. The greater the probability value for a given network issue, the greater the likelihood that such issue is present in the network under analysis.

The data processing system (e.g., the Prescriptive Diagnostic Engine 105, the operational monitoring service 212, etc.) can determine whether an issue has been detected (308). If an issue has been detected, the data processing system can determine an issue recommendation (310). In some implementations, the issue recommendation can include an automatic solution. In some implementations, the automatic solution can take the form of CWMP data to automatically resolve a network issue. The CWMP data can include, for example, configuration information for a given subscriber modem (e.g., a subscriber modem 130, other network device, etc.). The manual recommendation to resolve the network issue can include a list of suggestions for display on a user interface, for example the user interface of FIG. 5. If an issue has not been detected, the data processing system can continue to monitor network SNMP and TR-069 data (302) until an issue is detected. In some implementations, if an issue has not been detected, the data processing system can indicate the absence of network issues in the user interface.

The data processing system (e.g., the Prescriptive Diagnostic Engine 105, the operational monitoring service 212, etc.) can determine whether there is an automatic solution to an issue (312). If there is an automatic solution to a detected issue, the data processing system can generate protocol data to automatically resolve the issue (314). For example, if the data processing system detects that a subscriber modem 130 is configured incorrectly, the data processing system can generate CWMP data to reconfigure the modem. The CWMP data can include TR-069 protocol instructions to configure one or more devices of the network with identified issues. For example, the data processing system can determine a configuration of a subscriber modem that is causing the network issue, and subsequently generate CWMP instructions to reconfigure the subscriber modem to correct the improper configuration. This process can be an automatic solution to a network issue. Other issues, such as connectively issues relating to device signal power (e.g., not enough router range to communicate with all devices, etc.) can be solved via manual processes (e.g., the user adding a repeater to their subscriber network, etc.). If there is no automatic solution to an issue, the data processing system can suggest one or more manual solutions (316).

The data processing system (e.g., the Prescriptive Diagnostic Engine 105, the operational monitoring service 212, etc.) can suggest a manual solution (316). In some implementations, the manual solution can be a list for display on a user interface, for example the user interface of FIG. 5. In some implementations, the manual solution may be a notification message to a network operator. For example, the data processing system may detect a hardware failure (e.g., cannot communicate with one or more devices, one or more failure signals received, etc.) in the access network. The data processing system may not be able to automatically resolve this issue, and can instead suggest manual intervention. The data processing system can generate and provide an automatic notification (e.g., as part of a user interface, etc.) to the access network operator with information about the hardware failure and potential manual solutions.

Figure 4:
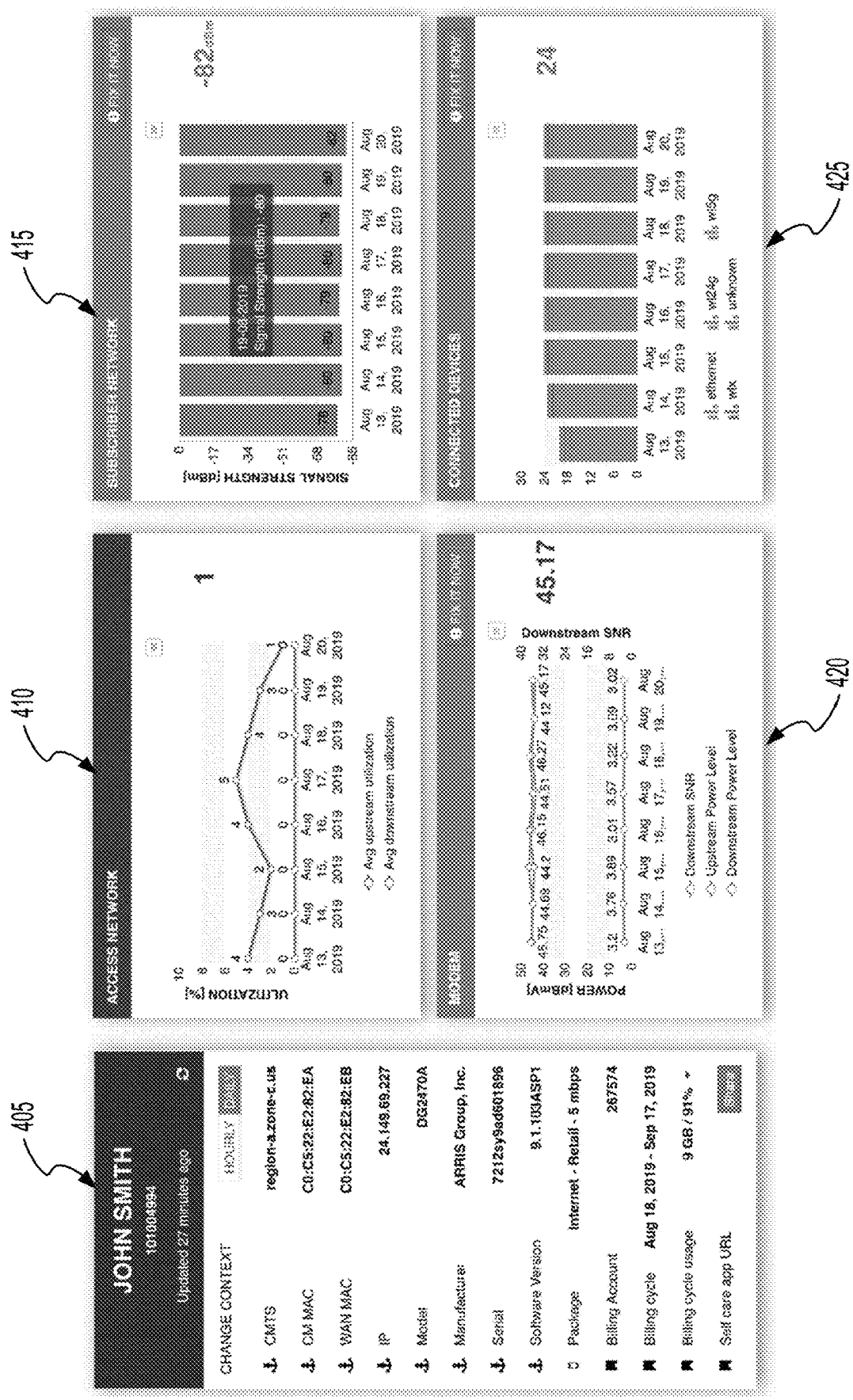
FIG. 4 shows an illustrative example of an embodiment of a user interface for viewing and managing a subscriber network.

FIG. 4 shows an illustrative example of an embodiment of a user interface for viewing and managing a subscriber network. The display in FIG. 4 can be identified by subscriber information pane 405. Information about the access network of a subscriber can be included in the access network pane 410. Signal strength of the subscriber network can be displayed in the subscriber network signal pane 415. Information about the subscriber modem can be included in the subscriber modem pane 420. Information about connected devices can be included in the subscriber devices pane 425.

The subscriber information pane 405 can include information about an individual subscriber. In this example representation, the subscriber information pane 405 includes the name of the subscriber, along with other subscriber information received from the modem of the subscriber and the CMTS of the subscriber. The subscriber information pane 405 also includes the web address of the CMTS servicing the modem of the subscriber. The subscriber information pane 405 can include information about the modem of the subscriber, including the MAC address, the WAN MAC address, the IP address, the model number, the manufacturer, the serial number, the software version, and the service package. The subscriber information pane also includes billing information about the subscriber, including the billing account, the current billing cycle, and the billing cycle usage. The subscriber information pane 405 also includes also includes a URL for a self-care application.

The access network pane 410 can include information about an access network, for example access network 120 of environment 100. The access network pane 410 can provide an average usage of a modems bandwidth usage. The usage can be displayed on a per channel basis (e.g., upstream channel usage and downstream channel usage). Upstream channel usage is related to the amount of data the modem sends to the cable head end. Downstream channel usage is related to the amount of data the head-end sends to the cable modem. The access network pane 410 can include the average modem utilization over a period of time, for example 1 week. In some implementations, the access network pane 410 can display usage over a different period of time (e.g., 1 day, 2 days, 1 week, 2 weeks, 1 month, 2 months, 1 year, etc.). In some implementations, the access network pane 410 can appear in different colors depending on the usage of the network. In some implementations, if an issue is detected related to the overall utilization, a button labelled "FIX IT NOW" can appear in the heading of the access network pane 410. When the button is pressed, the user interface can provide a list of possible suggestions or use the issue resolution generator 230 to attempt to automatically resolve the problem.

The subscriber network signal pane 415 can include information about the signal supplied to a subscriber, for example the signal provided by the cable head-end 125 to the subscriber modem 130. The subscriber network signal pane 415 can include the average modem signal quality over a period of time, for example 1 week. In some implementations, the subscriber network signal pane 415 can show signal quality over a different period of time (e.g., 1 day, 2 days, 1 week, 2 weeks, 1 month, 2 months, 1 year, etc.). The subscriber network signal pane 415 can appear in different colors depending on the signal strength of the modem. For example, if the signal strength of the modem is low (e.g., below a predetermined threshold, etc.), the subscriber network signal pane 415 can appear red. If the signal strength of the modem is high (e.g., above a predetermined threshold, etc.), the subscriber network signal pane 415 can appear green. In some implementations, if an issue is detected related to the signal strength, a button labelled "FIX IT NOW" can appear in the heading of the subscriber network signal pane 415. When the button is pressed, the user interface can provide a list of possible suggestions or use the issue resolution generator 230 to attempt to automatically resolve the problem.

The modem pane 420 can include information about the signal received at the subscriber modem, for example subscriber modem 130. The modem pane 420 can include the upstream power level, downstream power level, and the signal-to-noise ratio over a period of time, for example 1 week. In some implementations, the modem pane 420 can show upstream power level, downstream power level, and the signal-to-noise ratio over a different period of time (e.g., 1 day, 2 days, 1 week, 2 weeks, 1 month, 2 months, 1 year, etc.). In some implementations, if an issue is detected related to either the upstream power level, downstream power level, or the signal-to-noise ratio, a button labelled "FIX IT NOW" can appear in the heading of the modem pane 420. When the button is pressed, the user interface can provide a list of possible suggestions or use the issue resolution generator 230 to attempt to automatically resolve the problem.

The subscriber devices pane 425 can include information about subscriber devices, for example subscriber devices 140, connected to different interfaces (e.g. Ethernet, 2.4 GHz wireless, 5.0 GHz wireless, etc.) of the modem. The subscriber devices pane 425 can include the utilization of different modem interfaces over a period of time, for example 1 week. In some implementations, the subscriber devices pane 425 can show the utilization of different modem interfaces over a different period of time (e.g., 1 day, 2 days, 1 week, 2 weeks, 1 month, 2 months, 1 year, etc.). In some implementations, if an issue is detected related to the signal strength, a button labelled "FIX IT NOW" can appear in the heading of the subscriber network signal pane 415. When the button is pressed, the user interface can provide a list of possible suggestions or use the issue resolution generator 230 to attempt to automatically resolve the problem.

Figure 5:
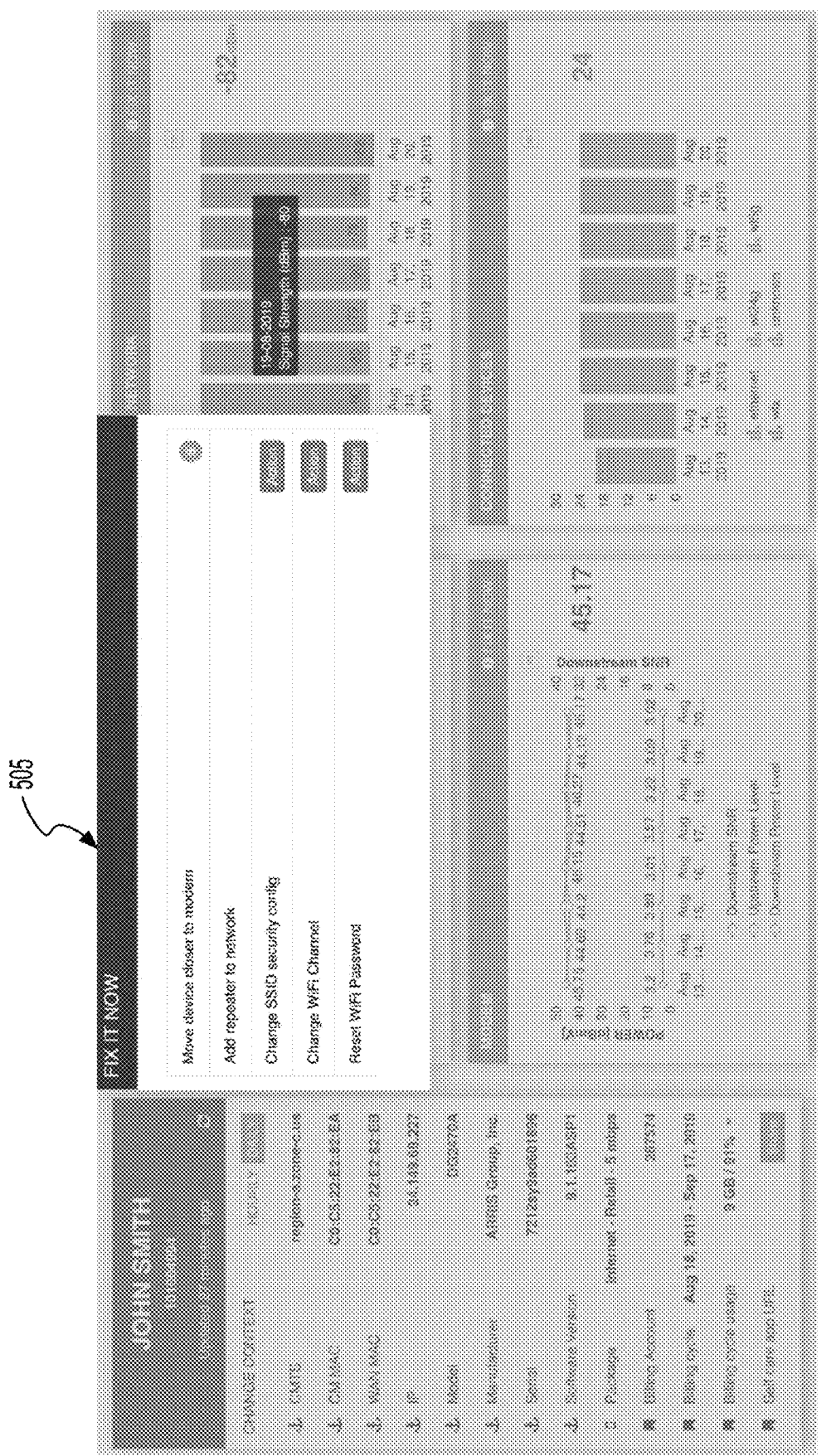
FIG. 5 shows an illustrative example of an embodiment of a user interface for providing resolution actions to solve an identified subscriber network issue.

FIG. 5 shows an illustrative example of an embodiment of a user interface for providing resolution actions to solve an identified subscriber network issue. The display in FIG. 5 can be identified by the issue resolution pane 505. The display in FIG. 5 can be a part of, or otherwise be provided by, the same application that provides the user interface depicted in FIG. 4. The display in FIG. 5 can be displayed, for example, in response to one or more events, such as an interaction with one or more actionable objects on the user interface (e.g., the "FIX IT NOW" button, other buttons, etc.). The user can modify the display of the interface shown in FIG. 5, for example by click-and-dragging the interface to a new location or resizing the interface. In some implementations, the display in FIG. 5 can be depicted as a pop-up window. In some implementations, the display in FIG. 5 can be shown in a different view, screen, or page of the application providing the user interface.

The issue resolution pane 505 can overlay the interface illustrated in FIG. 4 with an additional interface including issue solution data, for example the issue solution data 245. The issue resolution pane 505 can appear over the interface of FIG. 4 when a "FIX IT NOW" button has been pressed. In this example, the "FIX IT NOW" button was pressed on the subscriber network signal pane 415, which indicates that the subscriber wants to fix the wireless signal issues present in the subscriber network. The issue resolution pane 505 is generated by the issue resolution generator 230, and includes a list of possible solutions to the issue. In some implementations, the list is sorted based on the likelihood of the list item to solve the problem. In some implementations, the list is not sorted. Certain list items have a button labeled "Action" next to them. Pressing the "Action" button next to a list item attempts to automatically perform the action indicated by the user. For example, pressing the "Action" button next to the "Change WiFi channel" list item will cause the issue resolution generator 230 to generate policy management protocol data 235 to change the WiFi channel. In some implementations, certain list items may suggest manual user intervention. For example, pressing the "Action" button next to the "Change my password" list item will cause the user interface to request the user to input a new password for the modem, and change the configuration of the modem to accept the new password and not the old password. Once the new password has been entered, the issue resolution generator 230 generates policy management protocol data 235 to change the password of the modem to new password specified by the user.

FIG. 6 shows the general architecture of an illustrative computer system 600 that may be employed to implement any of the hardware systems, such as cable modems 130, head-end 125 or servers and computing devices discussed herein in accordance with some implementations. Each of the Prescriptive Diagnostic Engine 105, Operational Monitoring Service 212 or the other components of the Operational Monitoring Service 212 such as the network condition monitor 215, the network service correlator 220, the issue detection model 225, and the issue resolution generator 230 can be executed on one or more computing devices, for example the computer system 600. The computer system 600 of FIG. 6 comprises one or more processors 620 communicatively coupled to memory 625, one or more communications interfaces 605, and one or more output devices 610 (e.g., one or more display units) and one or more input devices 615.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring to the Operational Monitoring Service system 212 of FIG. 2, the Operational Monitoring Service system 212 can include the memory 625 to store information related to the network condition monitor 215, the network service correlator 220, the issue detection model 225, and the issue resolution generator 230, among others. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 6, one or more communications interfaces can facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 600.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the computer system 600 can include clients and servers. For example, the computer system 600 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 7:
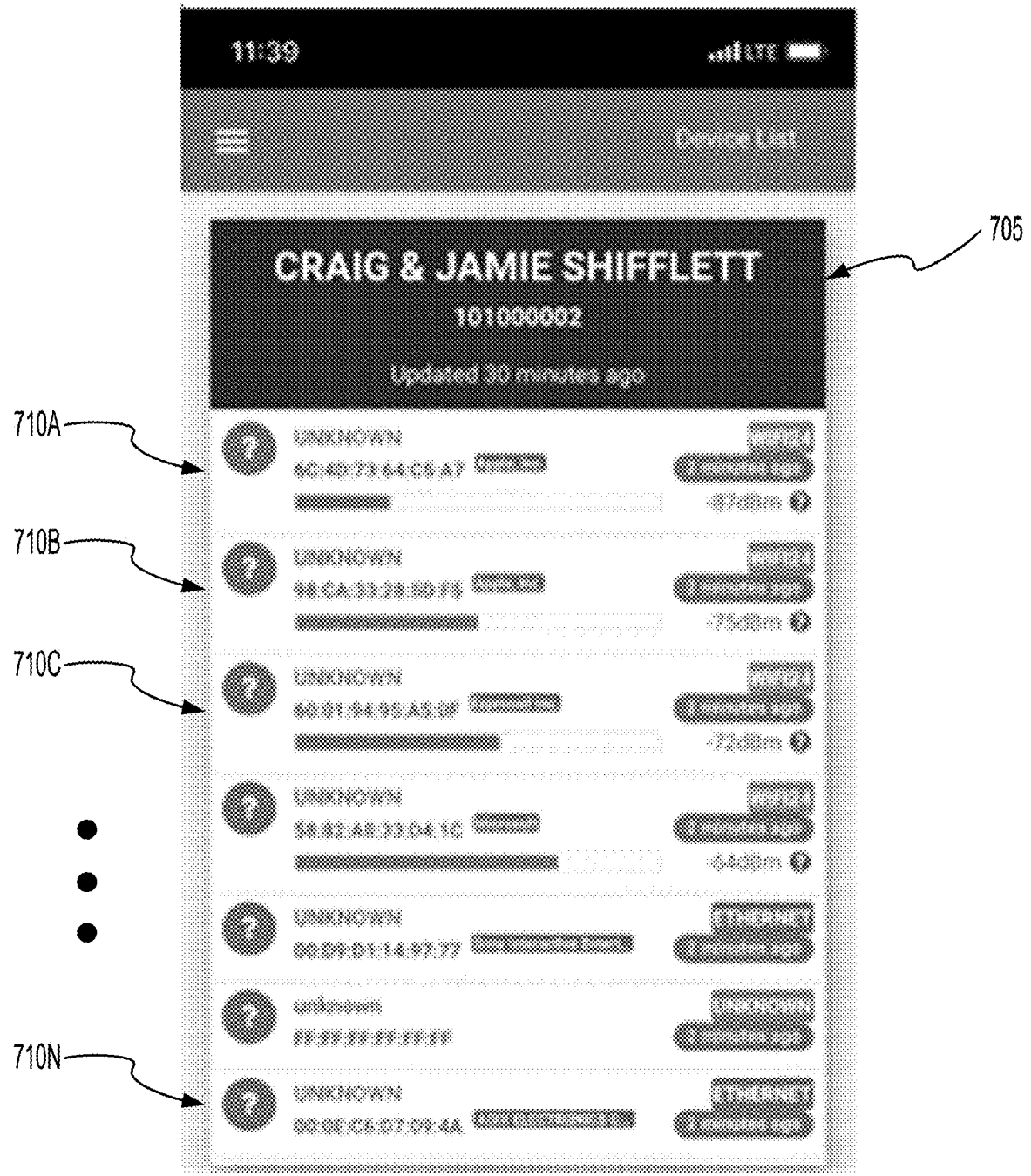
FIG. 7 shows an illustrative example of an embodiment of a user interface of a self-care mobile application providing a list of devices connected to a subscriber network.

FIG. 7 shows an illustrative example of an embodiment of a user interface of a self-care mobile application providing a list of devices connected to a subscriber network. The interface in FIG. 7 can be provided to a mobile device via a web browser or native application. The display in FIG. 7 can include a subscriber information pane 705. The display in FIG. 7 can also include a list of connected devices 710A-N (hereinafter 710). The display in FIG. 7 can be linked to the interface displayed in FIG. 4. For example, if the interface in FIG. 7 is monitoring the same network as what is displayed in the interface in FIG. 4, changes to the network performed using the interface displayed in FIG. 7 can propagate and be displayed in the interface that is displayed in FIG. 4.

The subscriber information pane 705 can provide the name or names of the subscribers accessing the interface. The subscriber information pane 705 can also include a subscriber identifier number. The subscriber information pane 705 can also include an update interval that indicates the amount of time that has passed since the information displayed in the interface of FIG. 7 has been updated or retrieved. In some implementations, the application that provides the interface depicted in FIG. 7 can update on a periodic basis (e.g., once every hour, once every 30 minutes, once every 10 minutes, any other period of time, etc.). In some implementations, a user can request that the interface displayed in FIG. 7 be updated to display up-to-date network information using one or more actionable objects on the user interface provided in FIG. 7.

The list of connected devices 710 can be displayed for each device in the subscriber network. Each of the list of connected devices 710 can include device specific information. The device specific information can include the name of the device, and the MAC address of the device. The device specific information can also include the interface the device uses to connect to the subscriber network. For example, if the device is connected to the subscriber network via an Ethernet interface, the device entry in the list of connected devices 710 can display "ETHERNET." In another example, if the device is connected to the subscriber network via a 2.4 GHz WiFi interface, the device entry in the list of connected devices 710 can display "WIFI24." In some implementations, the device specific information can include the manufacturer of the device. Each of the entries 710A-N of the list of connected devices 710 can include a time value that corresponds to how much time has elapsed since the data in each entry 710A-N has been updated, and can include a MAC address of each respective device that is connected to the network. Information about the manufacturer of each device in the list of devices 710 can be displayed in the interface depicted in FIG. 7. In some implementations, if a device is connected to the subscriber network via a wireless interface, the device entry in the list of connected devices 710 can include the signal strength between the subscriber network and the device. In some implementations, the signal strength can be measured in decibel-milliwatts (dBm).

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
   receiving, by a computing device comprising one or more processors coupled to memory, from an access network system in communication with a plurality of connected devices via an access network, network data including network parameters of the access network identifying the plurality of connected devices;
   instructing, by the computing device, the access network system to retrieve subscriber network parameters of a subscriber network, wherein the subscriber network is provided by a first connected device of the plurality of connected devices;
   generating, by the computing device, analytics data using the network parameters of the access network and the subscriber network parameters received from the first connected device via the access network system;
   generating, by the computing device, a classification of a network issue in the subscriber network by providing the analytics data and service package information of the first connected device as input to an issue detection model;

determining, by the computing device, a plurality of solutions to the network issue using the classification and the subscriber network parameters, the plurality of solutions comprising at least one manual solution and at least one automatic solution, the at least one automatic solution including a recommendation to change a wireless channel of the subscriber network;

providing, by the computing device, a graphical user interface listing the plurality of solutions with the classification of the network issue;

generating, by the computing device, responsive to an interaction with an entry in the listing corresponding to the recommendation to change the wireless channel of the subscriber network, policy management protocol data to change the wireless channel of the subscriber network to a second wireless channel; and transmitting, by the computing device, the policy management protocol data to the first connected device via the access network system to change the wireless channel of the subscriber network to the second wireless channel.

2. The method of claim 1, further comprising:
determining, by the computing device, that the network issue can be resolved via automatic intervention; and
generating, by the computing device, the policy management protocol data responsive to determining that the network issue can be resolved via automatic intervention.

3. The method of claim 1, wherein receiving the network data comprises receiving, by the computing device, at least one of simple network management protocol information or technical report information.

4. The method of claim 1, wherein receiving the network parameters further comprises:
receiving, by the computing device, usage information of the first connected device of the plurality of connected devices, the usage information including at least one of a signal strength of the first connected device, a bandwidth utilization of the first connected device, or device information of the first connected device; and
calculating, by the computing device, a ratio of the bandwidth utilization of the first connected device to a provisioned bandwidth of the first connected device as part of the network parameters of the access network.

5. The method of claim 1, wherein generating the analytics data further comprises:
identifying, by the computing device, a subset of connected devices from the plurality of connected devices that utilize network bandwidth above a predetermined threshold during a predetermined time period; and
generating, by the computing device, the analytics data such that the analytics data identifies the subset of connected devices that utilize network bandwidth above the predetermined threshold during the predetermined time period.

6. The method of claim 1, further comprising:
generating, by the computing device, using the issue detection model, a plurality of classifications of a second network issue;
providing, by the computing device, the plurality of classifications of the second network issue for display on a second user interface;
receiving, by the computing device, a selected classification of the plurality of classifications via the second user interface; and
training, by the computing device, the issue detection model based on the selected classification.

7. The method of claim 1, wherein the issue detection model is at least one of a linear regression model, a logistic regression model, a decision tree model, a support vector machine model, a Naïve Bayes model, a k-nearest neighbors model, a k-means model, a random forest model, a dimensionality reduction algorithm, a gradient boosting algorithm, a neural network, or a convolutional neural network.

8. The method of claim 1, wherein determining the plurality of solutions to the network issue comprises sorting, by the computing device, the plurality of solutions based on a likelihood of each of the plurality of solutions to solve the network issue.

9. The method of claim 8, wherein the graphical user interface provides the plurality of solutions in at least one first region of the graphical user interface, and provides the network parameters of the access network in at least one second region of the graphical user interface.

10. The method of claim 1, further comprising identifying, by the computing device, the first connected device as a subscriber package upgrade candidate based on the service package information.

11. A system, comprising:
one or more processors coupled to memory, the one or more processors configured to:
receive, from an access network system in communication with a plurality of connected devices via an access network, network data including network parameters of the access network identifying the plurality of connected devices;
instruct the access network system to retrieve subscriber network parameters of a subscriber network, wherein the subscriber network is provided by a first connected device of the plurality of connected devices;
generate analytics data using the network parameters of the access network and the subscriber network parameters received from the first connected device via the access network system;
generate a classification of a network issue in the subscriber network by providing the analytics data and service package information of the first connected device as input to an issue detection model;
determine a plurality of solutions to the network issue using the classification and the subscriber network parameters, the plurality of solutions comprising at least one manual solution and at least one automatic solution comprising a recommendation to change a wireless channel of the subscriber network;
provide a graphical user interface listing the plurality of solutions with the classification of the network issue;
generate, responsive to receiving a first interaction with an entry in the listing corresponding to the recommendation to change the wireless channel of the subscriber network, policy management protocol data to change the wireless channel of the subscriber network to a second wireless channel; and
transmit the policy management protocol data to the first connected device via the access network system to change the wireless channel of the subscriber network to the second wireless channel.

12. The system of claim 11, wherein the one or more processors are further configured to:

determine that the network issue can be resolved via automatic intervention; and generate the policy management protocol data responsive to determining that the network issue can be resolved via automatic intervention.

13. The system of claim 11, wherein the one or more processors, when receiving the network data, are configured to receive at least one of simple network management protocol information or technical report information.

14. The system of claim 11, wherein the one or more processors, when receiving the network parameters, are further configured to:

receive usage information of the first connected device of the plurality of connected devices, the usage information including at least one of a signal strength of the first connected device, a bandwidth utilization of the first connected device, or device information of the first connected device; and calculate a ratio of the bandwidth utilization of the first connected device to a provisioned bandwidth of the first connected device as part of the network parameters of the access network.

15. The system of claim 11, wherein the one or more processors, when generating the analytics data, are further configured to:

identify a subset of connected devices from the plurality of connected devices that utilize network bandwidth above a predetermined threshold during a predetermined time period; and generate the analytics data to indicate the subset of connected devices that utilize network bandwidth above the predetermined threshold during the predetermined time period.

16. The system of claim 11, wherein the one or more processors are further configured to:

generate using the issue detection model, a plurality of classifications of a second network issue;

provide the plurality of classifications of the second network issue for display on a second user interface;

receive a selected classification of the plurality of classifications from the second user interface; and train the issue detection model based on the selected classification.

17. The system of claim 11, wherein the issue detection model is at least one of a linear regression model, a logistic regression model, a decision tree model, a support vector machine model, a Naïve Bayes model, a k-nearest neighbors model, a k-means model, a random forest model, a dimensionality reduction algorithm, a gradient boosting algorithm, a neural network, or a convolutional neural network.

18. The system of claim 11, wherein the one or more processors, when determining the plurality of solutions to the network issue, are further configured to sort the plurality of solutions based on a likelihood of each of the plurality of solutions to solve the network issue.

19. The system of claim 18, wherein the graphical user interface provides the plurality of solutions in at least one first region of a user interface, and provides the network parameters of the access network in at least one second region of the user interface.

20. The system of claim 11, wherein the one or more processors are further configured to identify the first connected device as a subscriber package upgrade candidate based on the service package information.

* * * * *